United States Patent [19]

Dammann et al.

[11] Patent Number: 5,459,571
[45] Date of Patent: Oct. 17, 1995

[54] MULTIPLE CONTROL FREQUENCY PHASE MODULATOR IN PHASE MODULATED INTERFEROMETER PRECISION DISTANCE MEASURING SYSTEM

[75] Inventors: Ehrhard Dammann; Juergen Bauer, both of Jena, Germany

[73] Assignee: Jenoptik GmbH, Jena, Germany

[21] Appl. No.: 189,931

[22] Filed: Feb. 1, 1994

[30] Foreign Application Priority Data

Feb. 23, 1993 [DE] Germany .................. 43 05 458.7

[51] Int. Cl.$^6$ ..................................................... G01B 9/02
[52] U.S. Cl. ............................................. 356/345; 356/358
[58] Field of Search ................................ 356/357, 358, 356/363, 345

[56] References Cited

U.S. PATENT DOCUMENTS

| | | | |
|---|---|---|---|
| 4,422,764 | 12/1983 | Eastman | 356/357 |
| 5,141,315 | 8/1992 | Malvern | 356/345 |
| 5,212,825 | 5/1993 | Layton | 356/345 |
| 5,216,532 | 6/1993 | Taylor | 356/345 |
| 5,319,438 | 6/1994 | Kiasaleh | 356/345 |

*Primary Examiner*—Samuel A. Turner
*Assistant Examiner*—Jason D. Eisenberg
*Attorney, Agent, or Firm*—McAulay Fisher Nissen Goldberg & Kiel

[57] ABSTRACT

A phase-modulated interferometer has improved control and signal processing. Superimposition signals capable of evaluation in a phase-modulated interferometer without a complicated sawtooth control of the phase modulator are attained, in that two sinusoidal control signals which have modulation frequencies ($\omega_1$, $\omega_2$) and are rigidly coupled with respect to phase and frequency are applied to the known phase modulator and a cosine signal which is used in a conventional manner for evaluating the phase displacement is filtered of the superimposition signal generated in the interferometer by an electronic bandpass filter. At the filter frequency ($\omega_F$) of the bandpass filter, an odd-number harmonic and an even-number harmonic of the two modulation frequencies ($\omega_1$, $\omega_2$) have the same frequency, when the amplitudes ($\phi_1$, $\phi_2$) of the control signals satisfy the condition for the suitable operating point of the phase modulator. The improvement has application to phase-modulated interferometers, in particular, for precision distance measuring devices, preferably by the heterodyne evaluating method.

8 Claims, 3 Drawing Sheets

MULTIPLE CONTROL FREQUENCY PHASE MODULATOR IN PHASE MODULATED INTERFEROMETER PRECISION DISTANCE MEASURING SYSTEM

BACKGROUND OF THE INVENTION a) Field of the Invention

The invention is directed to a phase-modulated interferometer for evaluating phase displacements due to changes in optical path length in the measurement arm of the interferometer. It is used in particular for precision distance measuring systems which preferably make use of the heterodyne method for evaluating.

b) Background Art

Precision distance measuring systems based on interferometers have been known since lasers were first introduced. There is a basic distinction between homodyne and heterodyne evaluating methods. Heterodyne methods are generally preferred due to the possibility of counting forward and backward and the high interpolation due to the dwindling constant or direct light component. At present, single-sideband detection is used exclusively for evaluation. Zeemann splitting or Bragg deflection are used to generate a sideband or spatially separate the sidebands. In integrated-optical heterodyne interferometers, a frequency or phase modulation can also be effected in addition to the splitting and recombination of the beam. For reasons of stability and the difficulty of forming single-mode strip waveguides on layer waveguides, and vice versa, with the aid of tapers, lenses or grids, interferometers with continuous strip waveguides are desirable. However, this excludes the acousto-optical Bragg deflection for spatial separation of the sidebands. A phase modulation can be realized in the strip waveguide on the basis of the electro-optical effect. A sideband suppression can be achieved with a precisely defined electrical controlling of the modulator. For example, in IEEE Journ. Quant. Electr. QE-18 (1982), pages 124–129, Voges et al. describe a defined electrical control of the modulator by sawtooth pulses with defined flyback and accordingly achieve a sideband suppression of 40 dB. However, production of such control signals is complex and requires a very high outlay in regulating means.

OBJECT AND SUMMARY OF THE INVENTION

The primary object of the present invention is to realize a phase-modulated interferometer which succeeds in providing superimposition [beating or heterodyning] signals capable of evaluation from the measuring and reference arm of the interferometer without complicated control of the phase modulator.

In a phase-modulated interferometer with a measuring arm and a reference arm in which a phase modulator is arranged in one of the two arms of the interferometer for phase modulation of the optical beam and in which there is a detector for picking up an optical superimposition signal from the measuring and reference arm, evaluating electronics are arranged subsequent to the detector for determining the phase displacement of the signal. In such arrangement, the primary object is met, according to the invention, in that two sinusoidal control signals which have different modulation frequencies and amplitudes and are rigidly coupled with respect to phase and frequency are applied to the phase modulator and a bandpass filter is connected subsequent to the detector and filters a filter frequency from the frequency spectrum of the superimposition signal, which filter frequency satisfies the following condition:

$$\omega_F=(2m-1)\omega_1=2n\omega_2,$$

where m, n=1, 2, 3 ... and $\omega_1>\omega_2$, so that suitable selection of an operating point dependent on the amplitudes results in a signal having the structure $$S=\text{const}\cdot\cos(\omega_F t - kx),$$

which signal is evaluated with conventional methods for determining the phase displacement, where t designates time, k designates wave number, and x designates the distance to be measured.

The phase modulator is advantageously adjusted in such a way that the amplitudes of the control signals satisfy the equation $J_0(2\phi_2) J_{2n}(2\phi_2) = J_0(2\phi_1) J_{2m-1}(2\phi_1)$, where $J_i$ is the i-th Bessel function and m and n represent positive whole numbers, so that even-number indices of the Bessel function are on one side of the equation and odd-number indices are on the other side. One or more signals of different frequencies are advisedly filtered out of the superimposition signal to regulate the control signals.

In a three-arm interferometer having two reference arms to compensate for the wavelength drifts, it is advantageous to arrange a phase modulator in each of the reference arms so that only one of the two different sinusoidal control signals is modulated in each reference arm. In a three-arm interferometer with two measuring arms, preferably for achieving a distance measurement in two coordinate directions, it has proven advantageous to arrange a phase modulator in each of the measuring arms, the two different modulation frequencies being supplied in turn to each of these modulators. In the three-arm interferometer in particular, it is advantageous to carry out the splitting and recombination of the beams in measuring and reference arms and to realize the electro-optical phase modulators in integrated-optics. For certain applications, it may be advantageous to control the phase modulator or phase modulators with more than two sinusoidal control signals.

The basic idea of the invention consists in achieving, by means of a simple sinusoidal control of the phase modulator, a signal structure of the superimposition signal from the measuring and reference arm signal which can be evaluated in a known manner with respect to the phase displacements in the measuring arm. This is achieved, according to the invention, by effecting a modulation with two phase-coupled frequency-stable sine signals and effecting a narrow-band filtering of a frequency from the superimposition signal, which frequency corresponds to an odd-number harmonic of the first modulation frequency as well as to an even-number harmonic of the second modulation frequency. By selecting a suitable operating point of the phase modulator, the filtering results in a cosine signal which can be analyzed in a conventional manner for phase displacement.

Without using the complicated sawtooth control, the phase-modulated interferometer according to the invention makes it possible to arrive at the same signal structure which allows the evaluation of the phase displacement and accordingly the desired distance measurement. The simple sine control has the additional advantage that suitable electro-optical modulators can be realized in integrated-optical chips (IOC) and accordingly an integrated-optical phase-modulated interferometer, in particular a heterodyne interferometer, can be produced commercially for various technical applications.

The invention is explained in more detail in the following with reference to an embodiment example.

DESCRIPTION OF THE PREFERRED EMBODIMENTS

Figure 1:
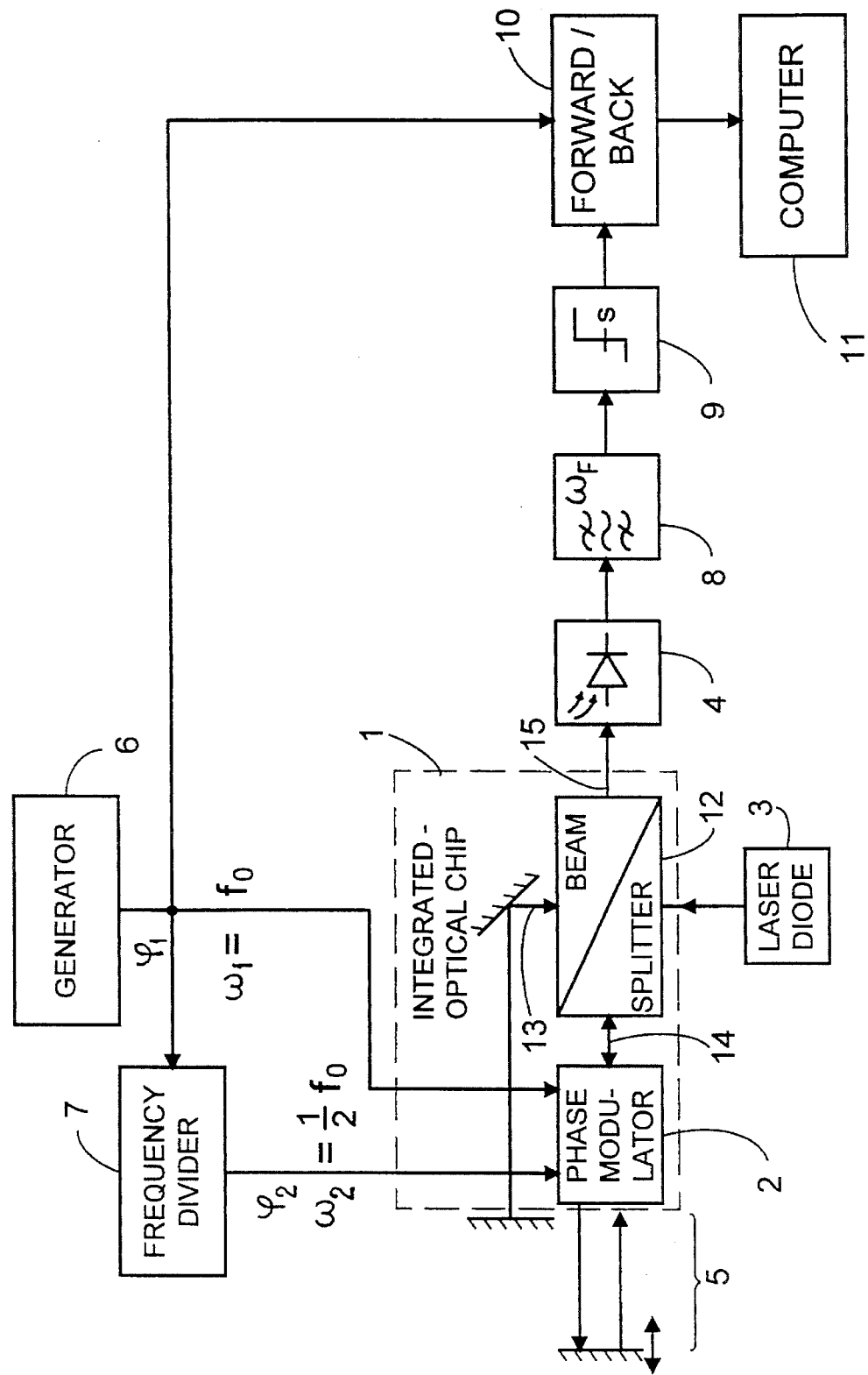
FIG. 1 shows a block diagram of the arrangement according to the invention.

As is shown in FIG. 1, the interferometer according to the invention is an interferometer arrangement which is preferably constructed as an integrated-optical chip 1 and contains a phase modulator 2 in one of its interferometer arms. The interferometer arrangement is conventionally coupled with a laser source, preferably in the form of a laser diode 3, a detector 4, and a measuring length 5 determining the measuring arm of the interferometer. FIG. 1 also shows the complete interferometer including beam splitter 12, reference arm 13, and superimposition signal 15. According to the invention, the phase modulator 2 is controlled with two control signals at modulation frequencies $\omega_1$ and $\omega_2$. The superimposition signal combined from the measuring arm and reference arm contains fundamental and harmonic waves of both modulation frequencies $\omega_1$ and $\omega_2$, from which a signal with filter frequency $\omega_F$ is filtered according to the invention by the bandpass filter 8. This signal is subjected to a threshold criterion in a comparator 9, examined in a directional discriminator 10 with respect to the direction of the phase displacement, and evaluated quantitatively in an evaluator computer 11. In addition, the control signals with modulation frequencies $\omega_1$ and $\omega_2$, which control signals are necessarily coupled rigidly with respect to frequency and phase, are advisedly preset by means of a generator 6, whose fundamental frequency $f_0$ is divided by a frequency divider 7. In the simplest case, the fundamental frequency $f_0$ is halved via the frequency divider 7, resulting in the modulation frequencies $\omega_1 = f_0$ and $\omega_2 = \frac{1}{2}f_0$ and the phase modulator 2 is controlled with the control signals $S_1$ and $S_2$ $$S_1(t) + S_2(t) = \phi_1 \sin(f_0 t) + \phi_2 \sin(\frac{1}{2} f_0 t),$$

where $\phi_1$ and $\phi_2$ are the amplitudes of the control signal components. When there is a fundamental frequency $f_0=10$ MHz of the generator 6 and the receiver signal is filtered at this frequency $\omega_F=10$ MHz, the second harmonic of the control signal $S_2=\phi_2 \sin(\frac{1}{2}f_0 t)$ and the first harmonic of the control signal $S_1=\phi_1 \sin(f_0 t)$ are obtained. Appropriate selection of the operating point of the phase modulator at $$J_0(2\phi_1) J_1(2\phi_1) = J_0(2\phi_2) J_2(2\phi_2)$$

results in a signal $$S(t) = \text{const} \cos(f_0 t - kx),$$

from which the phase displacement relative to the fundamental frequency $f_0$ can be determined in a known manner.

A second example for frequency selection is provided in order to make clear the general condition for selecting the filter frequency $\omega_F$. When the phase modulator 2 is controlled at the modulation frequencies $\omega_1=10$ MHz and $\omega_2=7.5$ MHz, the third harmonic is filtered out of the control signal $S_1$ and the fourth harmonic is filtered out of the control signal $S_2$ at $\omega_F=30$ MHz (corresponding to the formula for the filter frequency $\omega_F$ in claim 1) so that the aforementioned cosine signal which is capable of being evaluated results at the operating point $$J_0(2\phi_1) J_3(2\phi_1) = J_0(2\phi_2) J_4(2\phi_2).$$

Moreover, at an operating point of $2\phi_1=3.06$ and $2\phi_2=4.27$, fluctuations in amplitudes $\phi_1$ and $\phi_2$ only lead to minimum changes in the signal, since $$\left. \frac{d J_3(2\phi)}{d\phi} \right|_{\phi=1.53} \approx \left. \frac{d J_4(2\phi)}{d\phi} \right|_{\phi=2.135} \ll 1.$$

The selection of the modulation frequencies $\omega_1$ and $\omega_2$ is optional in principle provided the filter frequency $\omega_F$ satisfies the condition mentioned above. Due to the weakening of the signal of the higher harmonic, however, it is preferable that $\omega_1=f_0$, $\omega_2=\frac{1}{2}f_0$ and $\omega_F=f_0$. Accordingly, this has been assumed in the graphic representation in FIG. 1, but in no way limits the generality of the teaching according to the invention disclosed here.

Figure 2:
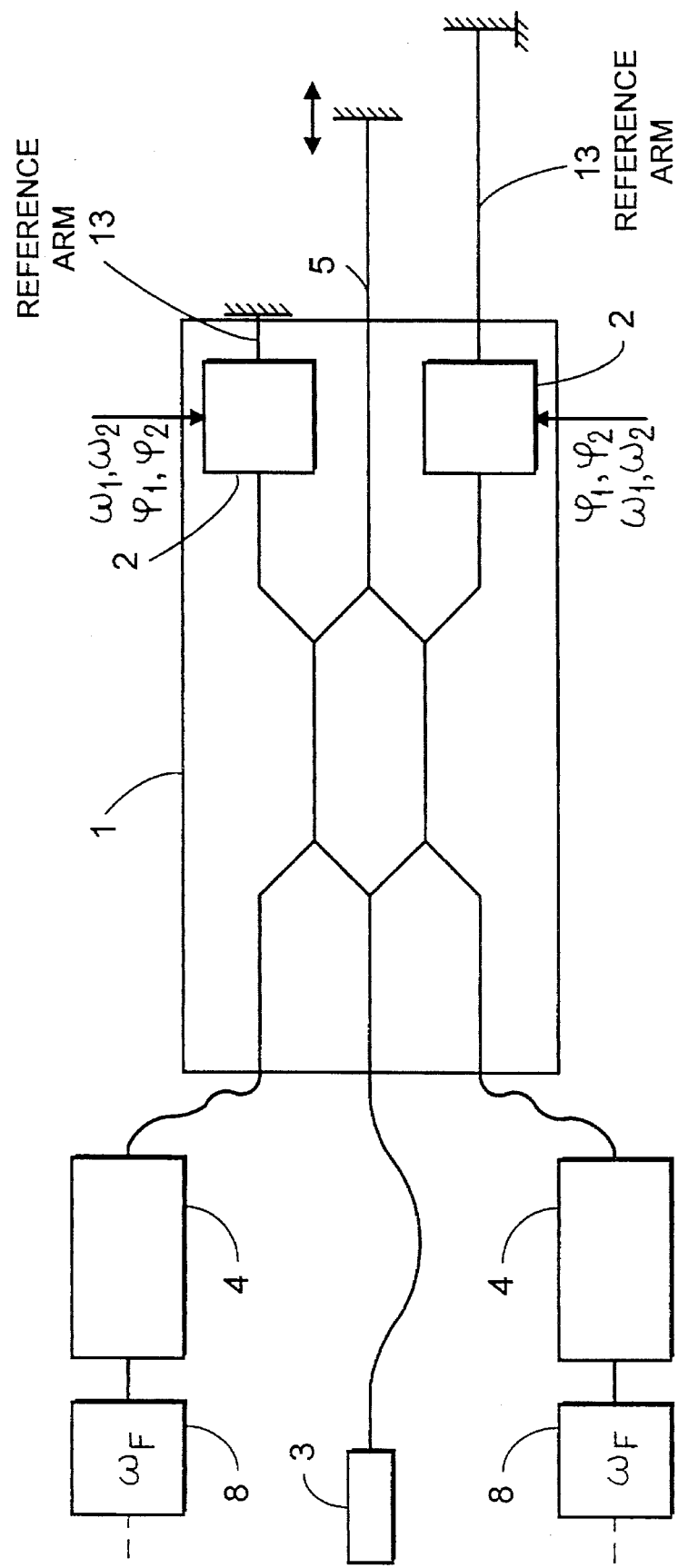
FIG. 2 shows a design form of a three-arm interferometer as integrated-optical double interferometer for compensation of wavelength drifts in distance measurement.

FIG. 2 shows an integrated-optical chip 1 for a three-arm interferometer with two reference arms. As is shown schematically in the drawing, the sequence of the measuring (element 5) and reference arms is reference arm—measuring arm 13—reference arm, and the measuring mirror moves in the interval between the two reference mirror positions. Accordingly, a distance measurement can be made independent of wavelength drifts of the laser diode 3 and changes in the optical characteristics along the measuring length 5. To be precise, this three-arm interferometer is a double interferometer with a common laser diode 3 and a common measuring length 5, because the invention requires an excitation of the phase modulator 2 with two modulation frequencies $\omega_1$ and $\omega_2$ in each interferometer in order to determine the occurring phase displacement between the measuring arm and a reference arm via the detector 4 and the bandpass filter 8 according to FIG. 1 and the prior art.

The modulation frequencies $\omega_1$ and $\omega_2$ for the two phase modulators 2 need not necessarily be identical. It is also possible to use an individual phase modulator 2 in the measuring arm before the start of the measuring length 5.

Figure 3:
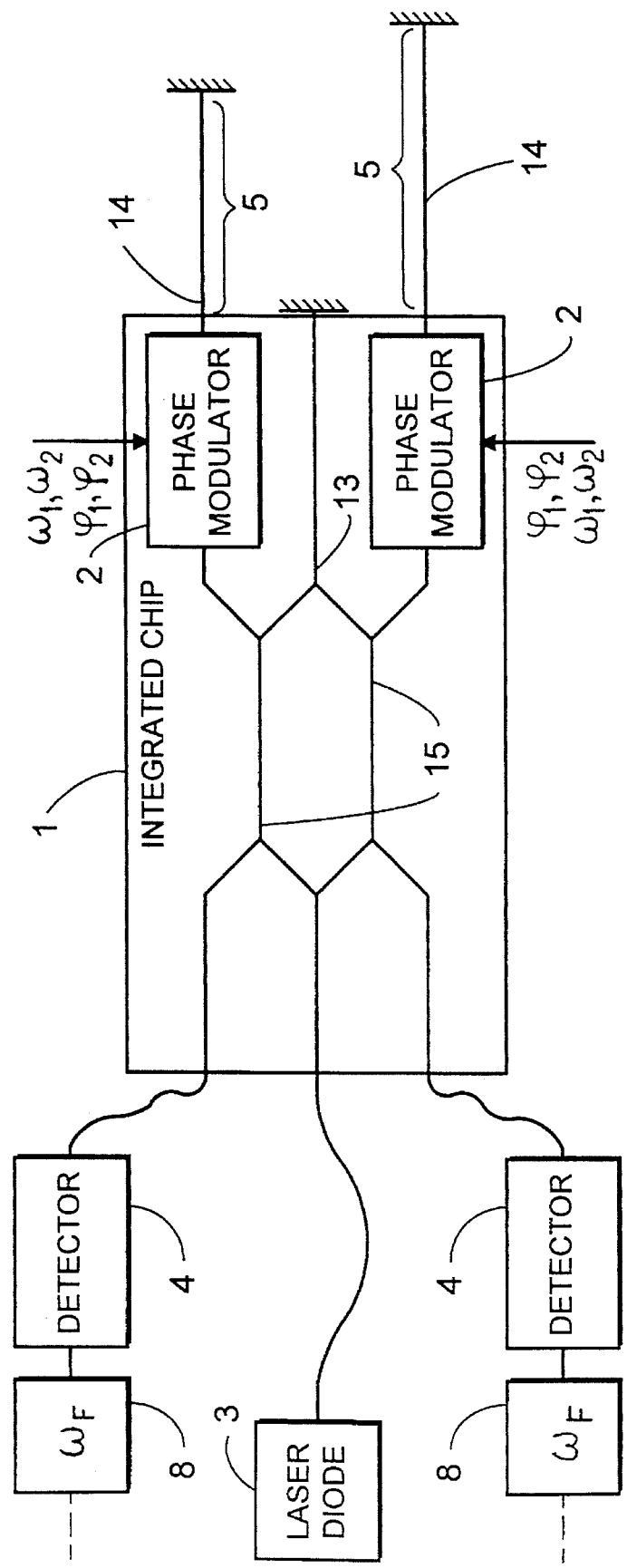
FIG. 3 illustrates an additional embodiment of the invention.

A three-arm interferometer with two measuring arms, preferably for coupled two-coordinate distance measurement, is constructed in principle in a manner analogous to the interferometer according to FIG. 2 and is shown in FIG. 3. In this case, the reference arm is centrally located on the chip 1. It still qualifies as a double interferometer with separate superimposition and evaluation. The reference arm is 13, the measurement arms 14 and the superimposition signals 15.

While the foregoing description and drawings represent the preferred embodiments of the present invention, it will be obvious to those skilled in the art that various changes and modifications may be made therein without departing from the true spirit and scope of the present invention.

What is claimed is:

1. A phase-modulated interferometer comprising:

a measuring arm;

a reference arm;

a phase modulator being arranged in one of said arms for phase modulation of an optical beam;

a detector for picking up an optical superimposition signal from said measuring and reference arm;

evaluating means being arranged subsequent to the detector for determining the phase displacement of the signal;

means for applying to the phase modulator two sinusoidal control signals which have different modulation frequencies ($\omega_1$, $\omega_2$) and amplitudes ($\phi_1$, $\phi_2$) and are rigidly coupled with respect to phase and frequency; and a bandpass filter being connected subsequent to said detector for filtering a filter frequency ($\omega_F$) from a frequency spectrum of the superimposition signal, which filter frequency ($\omega_F$) satisfies the following condition:

$$\omega_F=(2m-1)\omega_1=2n\omega_2,$$

where m, n=1, 2, 3 . . . and $\omega_1 > \omega_2$, so that suitable selection of an operating point dependent on the amplitudes ($\phi_1$, $\phi_2$) results in a signal having the structure $$S=\text{const} \cdot \cos(\omega_F t - kx),$$

which signal is evaluated for determining phase displacement, where t designates time, k designates wave number, and x designates distance to be measured.

2. An interferometer according to claim 1, wherein the phase modulator is adjusted in such a way that the amplitudes ($\phi_1$, $\phi_2$) of the control signals satisfy the equation $$J_0(2\phi_2)J_{2n}(2\phi_2)=J_0(2\phi_1)J_{2m-1}(2\phi_1),$$

where m, n=1, 2, 3 . . . and $J_i$ is the i-th Bessel function.

3. An interferometer according to claim 2, wherein one or more signals of different frequencies are filtered out of the frequency spectrum of the superimposition signal to regulate the amplitude ($\phi_1$, $\phi_2$) of the control signals.

4. An interferometer according to claim 1, wherein, in a three-arm interferometer in which there are two reference arms for compensating for wavelength drifts of a laser source, both of which reference arms produce two separately evaluated superimposition signals by means of superimposition with the same measuring arm, a phase modulator being arranged in each of the reference arms, wherein two control signals with the modulation frequencies ($\omega_1$, $\omega_2$) are applied to each of these phase modulators, which control signals are rigidly coupled with respect to frequency and phase.

5. An interferometer according to claim 4, wherein said measuring and reference arms and related superimposition signal processing, as well as realization of said phase modulators, are carried out by integrated optics.

6. An interferometer according to claim 1, wherein, in a three-arm interferometer with two measuring arms, for achieving a two-coordinate distance measurement, the two measuring arms producing two separately evaluated superimposition signals with the same reference arm, a phase modulator is arranged in the reference arm, both modulation frequencies ($\omega_1$, $\omega_2$) being supplied to the phase modulator as control signals.

7. An interferometer according to claim 6, wherein said measuring and reference arms and related superimposition signal processing, as well as realization of said phase modulators, are carried out by integrated optics.

8. An interferometer according to claim 1, wherein the phase modulator has a control with two or more sinusoidal control signals.

* * * * *